United States Patent [19]

Breglia et al.

[11] 4,317,610
[45] Mar. 2, 1982

[54] HOLOGRAPHIC TERRAIN SURFACE DISPLAY SYSTEM

[75] Inventors: Denis R. Breglia, Altamonte Springs; Alfred H. Rodemann, Maitland, both of Fla.

[73] Assignee: The United States of America as represented by the Secretary of the Navy, Washington, D.C.

[21] Appl. No.: 59,921

[22] Filed: Jul. 20, 1979

[51] Int. Cl.³ .......................... G03H 1/28; G09B 9/08
[52] U.S. Cl. .................................. 350/3.77; 350/3.85; 434/44; 434/43
[58] Field of Search ................. 35/12 N, 12 W, 12 R; 350/3.79, 3.75, 3.77, 3.78, 3.85, 3.86; 434/38, 40, 44, 47, 43

[56] References Cited

U.S. PATENT DOCUMENTS

| | | | |
|---|---|---|---|
| 3,632,181 | 1/1972 | Lee | 350/3.79 |
| 3,670,426 | 6/1972 | Horowitz | 35/12 N |
| 3,785,712 | 1/1974 | Hannan | 350/3.79 |
| 3,991,486 | 11/1976 | Derderian et al. | 35/12 N |
| 4,012,150 | 3/1977 | Upatnieks | 350/3.85 X |

OTHER PUBLICATIONS

Howard M. Smith, *Principles of Holography* ©1969, pp. 24–27.

Primary Examiner—Richard C. Pinkham
Assistant Examiner—Scott L. Brown
Attorney, Agent, or Firm—Robert F. Beers; Robert W. Adams; David S. Kalmbaugh

[57] ABSTRACT

A holographic terrain surface display system for simulating the visual scenes available to a trainee pilot with respect to a terrain surface. The holographic terrain surface display system according to the present invention comprises a holographic film, having a plurality of holograms, illuminated by a laser light beam. The laser light beam is focused on one of the plurality of holograms to generate a real image of the terrain surface. The real image of the terrain surface is then projected onto a spherical front projection screen to be observed by the trainee pilot, at a remote location, through a closed circuit television system.

10 Claims, 1 Drawing Figure

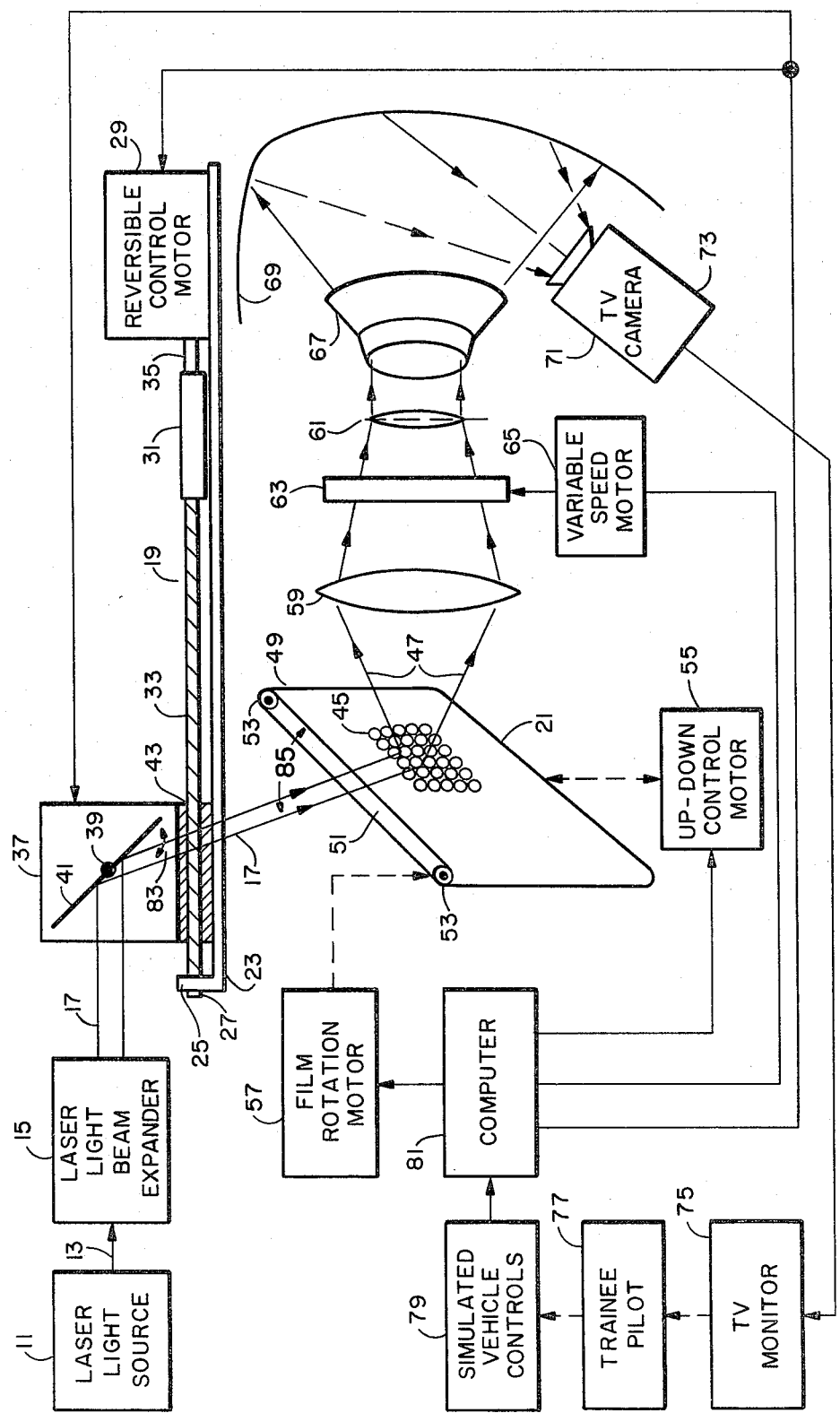

HOLOGRAPHIC TERRAIN SURFACE DISPLAY SYSTEM

BACKGROUND OF THE INVENTION

1. Field of the Invention

This invention relates generally to the field of visual display systems. In particular, this invention relates to a visual display system which employs a holographic film to generate a real image of a terrain surface.

2. Description of the Prior Art

A wide variety of visual display devices are available for the viewing of a terrain surface by a trainee pilot during simulated flight maneuvers. Such prior art devices include a programmed display apparatus which is a motion picture recording of a real world terrain surface along a fixed flight path. However, this device of the prior art ordinarily leaves something to be desired in that the trainee pilot is restricted to a fixed flight path and does not have the freedom to deviate from the fixed flight path.

A second device of the prior art utilizes a single large photograph for simulation of a terrain surface allowing for unprogrammed lateral excursions of the terrain surface. However, the perspective view of the terrain surface is fixed when the photograph is made. Therefore, for example, if a camera which made the photograph only saw the north side of a building, then the photograph will not contain any display of the south side of the building. This results in an unrealistic visual display of the building being presented to the trainee pilot during simulated flight maneuvers.

A third device of the prior art utilizes computer generated imagery consisting of an electronically stored terrain surface model which can be electronically manipulated and displayed from various perspective observation points. However, the present state of the art, as to computer generated imagery, limits the amount of detail in the terrain surface which can be displayed in real time. This limitation causes the terrain surface to appear unrealistic.

SUMMARY OF THE INVENTION

The subject invention overcomes some of the disadvantages of the prior art, including those mentioned above, in that it comprises a relatively simple terrain surface display system for simulating the visual scenes available to a trainee pilot with respect to a terrain surface.

The holographic terrain surface display system includes a holographic film having a plurality of Fraunhofer holograms, each of which projects a Fraunhofer diffraction pattern upon being illuminated by a laser beam. A monitoring means is adapted for receiving the Fraunhofer diffraction patterns and thereby form a real image of a terrain surface to be viewed by a trainee pilot in the azimuthal direction. A computer, which is responsive to a series of simulated flight maneuvers performed by the trainee pilot, generates a plurality of control signals. The plurality of control signals, when uniquely combined with a holographic film positioning assembly and a rotating mirror assembly, position the holographic film in a longitudinal as well as transverse direction, and provide for changes in elevation of the terrain surface being observed by the trainee pilot.

BRIEF DESCRIPTION OF THE DRAWING

FIG. 1 is a schematic block diagram of the subject invention.

DESCRIPTION OF THE PREFERRED EMBODIMENT

The preferred embodiment of the subject invention will now be discussed in some detail in conjunction with the drawing, wherein like parts are designated by like reference numerals.

Referring now to FIG. 1, there is shown a laser light source 11, which is preferably a monochromatic light source, for producing a narrow laser light beam 13 with a high degree of collimation. Spatially disposed downstream from laser light source 11 is laser light beam expander 15, the function of which is to expand laser light beam 13 to a predetermined cross-sectional area having a diameter of five millimeters. Laser light beam expander 15 may be a conventional inverted telescope.

A rotating mirror assembly 19 spatially disposed directly downstream from laser light beam expander 15 reflects expanded laser light beam 17 onto a holographic film 21, as will be discussed more fully below.

Rotating mirror assembly 19 comprises an elongated base 23 having an upwardly protruding member 25 positioned at one end of elongated base 23. Upwardly protruding member 25 has a centrally located circular perforation 27. A reversible control motor 29 is rigidly attached to the end of elongated base 23 opposite the end where upwardly protruding member 25 is positioned. A coupling 31, attached to shaft 35 of reversible control motor 29, is effectively connected to one end of a threaded rod 33, with the opposite end of threaded rod 33 passing through centrally located circular perforation 27. A galvanometer motor 37 has a threaded circular perforation 43 in the base thereof through which threaded rod 33 passes. Shaft 39 of galvanometer motor 37 is effectively connected to a mirror 41.

Holographic film 21 comprises a plurality of Fraunhofer holograms 45, each of which when illuminated by laser light beam 17 projects a Fraunhofer diffraction pattern at a plane 47. For a complete discussion of the method of producing holographic film 21, reference is hereby made to U.S. Patent Application entitled Holographic Storage of Terrain Data, by Alfred H. Rodemann and Denis R. Breglia, Ser. No. 059,922, filed concurrently with the subject application.

For the sake of clarity in discussing the subject invention and with reference to the aforementioned Patent Application Ser. No. 059,922, each Fraunhofer hologram 45 has multiplexed therein several Fraunhofer diffraction patterns. Each Fraunhofer diffraction pattern is a recording of a wide angle photograph of one of a matrix of perspective points of a real world terrain surface taken at a predetermined altitude above the terrain surface. The multiplexing of several Fraunhofer diffraction patterns within each Fraunhofer hologram is, in turn, accomplished by varying the angle of which an incoming reference laser light beam is incident upon holographic film 21. Thus, each Fraunhofer hologram 45 is multiplexed with several Fraunhofer diffraction patterns corresponding to several different altitudes at the same horizontal coordinates above the real world terrain surface. Upon illumination by laser source 11, the Fraunhofer diffraction patterns of each hologram 45 reconstruct real images of the aforementioned terrain surface. As will be explained more fully below, by varying the angle at which laser light beam 17 is incident upon each hologram 45 several Fraunhofer diffraction patterns may be reconstructed therefrom with each Fraunhofer diffraction pattern being a real image of the abovementioned real world terrain surface.

A holographic film positioning assembly 49, the function of which is to position holographic film 21, comprises a rectangular frame assembly 51 having a pair of drive rollers 53 upon which holographic film 21 is rolled. An up-down control motor 55 is effectively connected to rectangular frame assembly 51, while a film rotation motor 57 is connected to the pair of drive rollers 53 of rectangular frame assembly 51.

A lens 59, spatially disposed downstream from holographic film 21, is characterized by its ability to form a real image 61 of a terrain surface. A prism 63, positioned directly downstream from lens 59, rotates real image 61 so as to allow real image 61 to be viewed in an azimuthal direction. A variable speed motor 65 is effectively connected to prism 63.

A lens 67 spatially disposed directly downstream from prism 63 projects real image 61 onto a spherical front projection screen 69. A closed circuit television system 71 positioned in front of spherical front projection screen 69 monitors real image 61 projected on spherical front projection screen 69 so as to allow a trainee pilot 77 at a location distant from spherical front projection screen 69 to view real image 61. Closed circuit television system 71 includes a television camera 73, the output of which is connected to a television monitor 75.

An aircraft control panel 79 spatially disposed in front of trainee pilot 77 has its output effectively connected to a computer 81. The first signal output of computer 81 is connected to the input of film rotation motor 57, the second signal output of computer 81 is connected to the input of up-down control motor 55, the third signal output of computer 81 is connected to the input of variable speed motor 65, and the fourth signal output of computer 81 is connected to the input of reversible control motor 29 and the input of galvanometer motor 37.

At this time, it would be noteworthy to state that all of the elements shown in FIG. 1 which make up the subject invention, which the exception of holographic film 21 and computer 81, are well known, conventional, and commercially available. As mentioned previously, the method of producing holographic film 21 is fully discussed in U.S. Patent Application Ser. No. 059,922 entitled Holographic Storage of Terrain Data. Computer 81 may be an SEL 32/55 digital computer manufactured by Systems Engineering Laboratory of Fort Lauderdale, Florida.

The operation of the subject invention will now be discussed briefly in conjunction with the figure of the drawing.

The narrow collimated beam of monochromatic laser light 13 is directed by laser light source 11 through laser light beam expander 15 which expands it to a predetermined cross-sectional area so that it becomes expanded laser light beam 17. The predetermined cross-sectional area of expanded laser light beam 17 has a diameter of five millimeters, which is equal to the diameter of one of the plurality of Fraunhofer holograms 45 of holographic film 21.

Expanded laser light beam 17 is, in turn, reflected by rotating mirror assembly 19 onto holographic film 21, which, as mentioned above, comprises a plurality of Fraunhofer holograms 45. For the sake of clarity in describing the operation of the subject invention, it may be assumed that expanded laser light beam 17 is incident upon a selected hologram 45 of holographic film 21.

Rotating mirror assembly 19 varies the angle 83 at which expanded laser light beam 17 is reflected, thus varying the angle 85 at which expanded laser light beam 17 is incident upon Fraunhofer hologram 45 of holographic film 21. This variation of the angle 85 at which expanded laser light beam 17 is incident upon Fraunhofer hologram 45 varies the apparent altitude above the terrain surface of real image 61 viewed by trainee pilot 77 on television monitor 75. For a complete discussion of the operation of Fraunhofer hologram 45, reference is hereby made to U.S. Patent Application entitled Holographic Storage of Terrain Data, by Alfred H. Rodemann and Denis R. Breglia, Ser. No. 059,922.

At this time it is noteworthy to mention that Fraunhofer hologram 45 is made such that upon illumination with collimated, monochromatic light of the same wavelength as used to record Fraunhofer hologram 45, at the same angle of incidence 85 as used to record Fraunhofer hologram 45, a first Fraunhofer diffraction pattern is reconstructed at plane 47. A change in the angle 85 at which expanded laser light beam 17 is incident upon Fraunhofer hologram 45 will cause a second Fraunhofer diffraction pattern to be reconstructed at plane 47, thus accounting for the change in the apparent altitude above the terrain surface of real image 61 viewed by trainee pilot 77.

Aircraft control panel 79, in response to a series of simulated flight maneuvers performed by trainee pilot 77, generates a control data signal. Computer 81 processes the control data signal generated by aircraft control panel 79 according to a flight simulation program and produces a longitudinal direction control signal, a transverse direction control signal, an altitude control signal, and an azimuthal direction control signal which are in response to the processing of the control data signal by the flight simulation program.

The altitude control signal, produced by computer 81, is supplied to the inputs of reversible control motor 19 and galvanometer motor 37. Reversible control motor 29 rotates threaded rod 33 in either a clockwise or counterclockwise direction, causing galvanometer motor 37 to slide along base 23 of rotating mirror assembly 19, while galvanometer motor 37 rotates mirror 41 in either a clockwise or counter clockwise direction. This allows rotating mirror assembly 19, as discussed previously, to vary the angle 85 at which expanded laser light beam 17 is incident upon Fraunhofer hologram 45 resulting in the apparent altitude change of the terrain surface of real image 61 viewed by trainee pilot 77.

Holographic film positioning assembly 49 indexes holographic film 21 to a predetermined hologram of the plurality of holograms 45. The longitudinal direction control signal, generated by computer 81, activates film rotation motor 57 so as to position holographic film 21 in a longitudinal direction. The transverse direction control signal generated by computer 81 activates up-down control motor 55 so as to position holographic film 21 in a transverse direction, thereby allowing access to any one of the plurality of holograms 45. Accordingly, the terrain surface viewed by trainee pilot 77 on television monitor 75 will change in the horizontal plane and thus in appearance, depending upon which of the plurality of holograms 45 is indexed by holographic film positioning assembly 49.

Lens 59 is characterized by its ability to form real image 61. Real image 61, as mentioned above, is the terrain surface trainee pilot 77 will observe on television monitor 75 during simulated flight maneuvers over a flight path, and may, for example, be a model board or a real world terrain surface. Variable speed motor 65, upon being activated by the azimuthal direction control signal generated by computer 81, rotates prism 63, thereby rotating real image 61 so as to allow real image 61 to be viewed in an azimuthal direction. Thus, for example, when trainee pilot 77 observes a building during simulated flight maneuvers on television monitor 75, trainee pilot 77 will observe the north side as well as the south side of the building upon passing over the building.

Lens 67 projects real image 61 onto spherical front projection screen 69. Television camera 73, in turn, monitors real image 61 so as to allow trainee pilot 77 to view the terrain surface of real image 61 on television monitor 75.

From the foregoing description, it may readily be seen that the subject invention comprises a new, unique, and exceedingly useful holographic terrain surface display system which constitutes a considerable improvement over the prior art. Obviously, many modifications and variations of the present invention are possible in light of the above teachings. It is, therefore, to be understood that within the scope of the appended claims the invention may be practiced otherwise than as specifically described.

What is claimed is:

1. An apparatus for the visual display of a terrain surface, comprising in combination:
   means for generating a collimated monochromatic laser light beam;
   means spatially disposed downstream from said laser light beam generating means for expanding said laser light beam to a predetermined cross-sectional area;
   mirror means spatially disposed directly downstream from said means for expanding said laser light beam, and having a signal input;
   a halographic film positioned adjacent to said mirror means and having thereon a plurality of Fraunhofer holograms, each of said plurality of Fraunhofer holograms having therein a plurality of Fraunhofer diffraction patterns;
   said mirror means being adapted for reflecting said laser light beam onto said holographic film such that said laser light beam is incident upon only one of said plurality of Fraunhofer holograms during any time period;
   said mirror means being adapted for varying the angle at which said expanded laser light beam is reflected thereby so as to vary the angle at which said expanded laser light beam is incident upon each of said Fraunhofer holograms;
   each of said Fraunhofer diffraction patterns being correlated to a predetermined angle of incidence of said laser light beam upon said halogram, such that the respective Fraunhofer diffraction pattern is reconstructed at a predetermined image plane when said hologram is illuminated by said laser light beam at said predetermined angle of incidence; and
   means spatially disposed downstream from said holographic film adapted for forming a real image upon receiving the Fraunhofer diffraction pattern for rotating said real image formed thereby so as to modify said real image in an azimuthal direction to allow for the viewing of said real image, and for projecting said modified real image.

2. An apparatus according to claim 1, wherein said means for expanding said laser light beam comprises an inverted telescope.

3. An apparatus according to claim 1, wherein said predetermined cross-sectional area comprises a circle having a diameter of five millimeters.

4. An apparatus according to claim 1, wherein said mirror means comprises:
   an elongated base having an upwardly protruding member at one end of said base, said upwardly protruding member having a centrally located circular perforation;
   a reversible control motor rigidly attached to the other end of said elongated base, said reversible control motor having a rotatable shaft and an input;
   a coupling effectively attached to the shaft of said reversible control motor;
   a rotatable threaded rod having one end thereof effectively connected to said coupling, and having the opposite end thereof passing through the centrally located circular perforation of said upwardly protruding member, said threaded rod to rotate in either a clockwise or counterclockwise direction when said reversible control motor is activated;
   a galvanometer motor having an input, and a rotatable shaft;
   a motor base having a threaded circular perforation through which said threaded rod passes and having said galvanometer motor mounted thereon, said motor base slidably mounted on said elongated base for movement when said control motor is activated;
   a rotatable mirror effectively connected to the shaft of said galvanometer motor, said mirror to rotate when said galvanometer motor is activated; and
   a computer having an output effectively connected to the input of said reversible control motor and the input of said galvanometer motor, said computer to provide a control signal so as to effect the activation of said galvanometer motor and said reversible control motor, thereby causing said mirror means to vary the angle at which said laser light beam is reflected thereby.

5. An apparatus according to claim 1, wherein said means for forming a real image comprises:
   a first lens spatially disposed downstream from said holographic film, for forming said real image upon receiving each Fraunhofer diffraction pattern of each of said plurality of Fraunhofer holograms;
   a rotatable prism positioned directly downstream from said first lens for rotating said real image formed by said first lens so as to modify said real image to allow for the viewing of said real image in an azimuthal direction;
   a motor having an input and a rotatable shaft connected to said rotatable prism, said motor to rotate said prism when said motor is activated;
   a second lens spatially disposed directly downstream from said prism for projecting said modified real image onto a spherical front projection screen; and a computer having an output effectively connected to the input of said motor, said computer to provide an azimuthal direction control signal so as to effect the activation of said motor, thereby causing said prism to rotate so as to allow for the viewing of said real image in said azimuthal direction.

6. An apparatus according to claim 1, wherein said real image is a terrain surface.

7. A holographic terrain surface display system comprising, in combination:

a laser light source for producing a collimated monochromatic laser light source;

a laser light beam expander spatially disposed downstream from said laser light source for expanding said laser light beam to a predetermined cross-sectional area;

a rotatable mirror assembly spatially disposed directly downstream from said laser light beam expander, and having a signal input;

a holographic film positioned adjacent to said rotatable mirror assembly and having thereon a plurality of Fraunhofer holograms, with each Fraunhofer hologram scaled equivalent to said expanded laser light beam;

said rotatable mirror assembly being adapted for reflecting said expanded laser light beam onto said holographic film such that said laser light beam is incident upon only one of said plurality of Fraunhofer holograms during any time period;

said rotatable mirror assembly being adapted for varying the angle at which said expanded laser light beam is reflected thereby so as to vary the angle at which said expanded laser light beam is incident upon each of said Fraunhofer holograms;

each of said plurality of Fraunhofer holograms having therein a plurality of Fraunhofer diffraction patterns;

each of said Fraunhofer diffraction patterns being correlated to a predetermined angle of incidence of said laser light beam upon said hologram, and each of said Fraunhofer diffraction patterns being reconstructed at a predetermined image plane when said hologram is illuminated by said laser light beam at said predetermined angle of incidence;

a first lens, spatially disposed downstream from said holographic film, said first lens being adapted for forming a real image upon receiving each Fraunhofer diffraction pattern of said Fraunhofer holograms;

a rotatable prism positioned directly downstream from said first lens for rotating said real image formed by said first lens so as to modify said real image in an azimuthal direction to allow for the viewing of said real image;

a motor having an input and a rotatable shaft connected to said prism, said motor to rotate said prism when activated;

a second lens spatially disposed directly downstream from said prism, for projecting said modified real image onto a spherical front projection screen; and a computer having a first signal output, and a second signal output, with the first signal output thereof connected to the signal input of said rotating mirror assembly, and the second signal output thereof connected to the input of said motor, said computer to provide a first control signal so as to effect the activation of said rotatable mirror assembly such that said rotatable mirror assembly varies the angle at which said laser light beam is reflected thereby, and a second control signal to effect the activation of said motor, thereby causing said prism to rotate so as to allow for the viewing of said real image in an azimuthal direction.

8. A holographic terrain surface display system according to claim 7, wherein said laser beam expander comprises an inverted telescope.

9. A holographic terrain surface display system according to claim 7, wherein said rotatable mirror assembly comprises:

an elongated base having an upwardly protruding member positioned at one end thereof, said upwardly protruding member having a centrally located circular perforation;

a reversible control motor rigidly attached to the opposite end of said elongated base, said reversible motor having a rotatable shaft and an input connected to the first signal output of said computer;

a coupling effectively attached to the shaft of said reversible control motor;

a rotatable threaded rod having one end thereof effectively connected to said coupling and having the opposite end thereof passing through the centrally located circular perforation of said upwardly protruding member, said threaded rod to rotate in either a clockwise or counterclockwise direction when said reversible control motor is activated by the first control signal provided by said computer;

a galvanometer motor having an input connected to the second signal output of said computer, and a rotatable shaft;

a motor base having threaded circular perforation through which said threaded rod passes, and having said galvanometer motor mounted thereon, said motor base to slide along said elongated base when said control motor is activated, thereby moving said galvanometer motor upon said elongated base;

a rotatable mirror effectively connected to the shaft of said galvanometer motor, said mirror to rotate in either a clockwise or counterclockwise direction when said galvanometer motor is activated by the first control signal provided by said computer; and said rotatable mirror to vary the angle at which said laser light beam is incident upon said holographic recording material.

10. A holographic terrain surface display system according to claim 7, wherein said real image comprises a terrain surface.

* * * * *